US007670513B2

(12) United States Patent
Erdner et al.

(10) Patent No.: US 7,670,513 B2
(45) Date of Patent: Mar. 2, 2010

(54) FIRE CONTROL COMPOSITION AND METHOD

(75) Inventors: Seth Erdner, Matthews, NC (US); Dwight Pakan, Charlotte, NC (US)

(73) Assignee: BASF Aktiengesellschaft, Ludwigshafen (DE)

( * ) Notice: Subject to any disclaimer, the term of this patent is extended or adjusted under 35 U.S.C. 154(b) by 1039 days.

(21) Appl. No.: 10/563,629

(22) PCT Filed: Jul. 3, 2004

(86) PCT No.: PCT/EP2004/007256

§ 371 (c)(1),
(2), (4) Date: Feb. 13, 2006

(87) PCT Pub. No.: WO2005/014115

PCT Pub. Date: Feb. 17, 2005

(65) Prior Publication Data

US 2006/0157668 A1 Jul. 20, 2006

Related U.S. Application Data

(60) Provisional application No. 60/489,430, filed on Jul. 23, 2003, provisional application No. 60/508,093, filed on Oct. 2, 2003.

(51) Int. Cl.
*C09K 21/00* (2006.01)
*A62D 1/00* (2006.01)
*C08F 220/56* (2006.01)

(52) U.S. Cl. .............................. 252/610; 252/2; 252/3; 252/601; 524/547

(58) Field of Classification Search ..................... 252/2, 252/3, 601, 610; 524/547
See application file for complete search history.

(56) References Cited

U.S. PATENT DOCUMENTS

| | | | | |
|---|---|---|---|---|
| 3,354,084 | A * | 11/1967 | Katzer | 252/2 |
| 5,190,110 | A | 3/1993 | von Blucher et al. | |
| 5,849,210 | A * | 12/1998 | Pascente et al. | 252/3 |
| 2002/0013403 | A1* | 1/2002 | Vandersall | 524/547 |
| 2002/0014610 | A1* | 2/2002 | Tanaka et al. | 252/3 |
| 2002/0189492 | A1 | 12/2002 | Vandersall et al. | |

FOREIGN PATENT DOCUMENTS

| | | |
|---|---|---|
| EP | 0 649 669 | 4/1995 |
| EP | 0 911 067 | 4/1999 |
| JP | 56 125066 | 10/1981 |

* cited by examiner

*Primary Examiner*—James Siedleck
*Assistant Examiner*—Aaron Greso
(74) *Attorney, Agent, or Firm*—Marshall, Gerstein & Borun LLP

(57) ABSTRACT

A composition and method of controlling a fire are disclosed. The composition contains a superabsorbent polymer, a colorant, an opacifying agent, and water. The method includes a step of applying the composition to a combustible object, either before or after initiation of combustion. The composition and method are especially useful for application to vegetation or foliage to prevent, retard, suppress, and/or extinguish forest fires and wildfires.

15 Claims, No Drawings

FIRE CONTROL COMPOSITION AND METHOD

CROSS-REFERENCE TO RELATED APPLICATIONS

This is the U.S. national phase application of International Application No. PCT/EP2004/007256, filed Jul. 3, 2004, which claims the benefit of U.S. Provisional Patent Application No. 60/508,093, filed Oct. 2, 2003 and U.S. Provisional Patent Application No. 60/489,430, filed Jul. 23, 2003.

FIELD OF THE INVENTION

The present invention relates to compositions and methods of controlling a fire. More particularly, the present invention relates to compositions and methods that prevent, retard, suppress, or extinguish fires, such as building fires, forest fires, and wildfires. The fire-fighting composition comprises a superabsorbent polymer (SAP), a colorant, an opacifying agent, and water. The method comprises applying a sufficient amount of the aqueous fire-fighting composition to natural or man-made combustible objects, either before or after initiation of combustion, to prevent, retard, suppress, or extinguish a fire.

BACKGROUND OF THE INVENTION

Water is the material of choice to extinguish most fires or to prevent combustible objects from burning. Water predominantly is supplied from a network of pipes or, in the case of a forest fire, for example, from natural waters. In fire fighting, water contacts burning objects which results in sufficient cooling such that the burning objects fall below their combustion or ignition temperature, and new ignition is precluded. In addition, when water contacts hot objects, the water vaporizes to produce steam, which expands and expels the air necessary for combustion.

When a fire is extinguished by spraying water on the fire, less than 10% of the sprayed water is effective because of water loss, such as by run-off or evaporation. This is particularly disadvantageous in the case of forest fires and wildfires because a considerable portion of the water often is transported a long distance at a great expense, and then is wasted. To date, it has not been possible to make optimum use of water in forest fires and wildfires because such fires are frequently preceded by a period of drought and, accordingly, the ground has a particularly high water absorptive capacity. The waste of water is a very important aspect of forest fire fighting because a forest fire typically consumes the dry undergrowth (e.g., grass, foliage, and heather) and leads to individual crown fires which then unite.

The problem of ineffective water usage also is encountered in other types of fires, for example, when a roof of a building is on fire. In this case, the water often reaches the lower stories of the building through floors, openings, and staircases, for example, and is thereby lost for fire fighting purposes. This creates a potential lack of water, such that the fire spreads from the burning roof downwards. In addition, the water running off to lower stories frequently results in considerable water damage.

Forest fires and brush fires annually cause the loss of millions of dollars worth of timber and other property. Extensive damage often occurs because by the time the fire is detected, and before control measures can be applied, the fire is out of control in a condition known as a “wildfire”. The direct property loss due to such fires is catastrophic, and the associated soil erosion and watershed problems also are significant. It is important, therefore, to minimize and control the spread of forest fires whenever possible.

Another problem encountered in fighting a forest fire is an inability to precisely determine which objects, or areas, have been sprayed and which have not. This is an especially difficult problem encountered in the aerial firefighting of forest fires. Effective fire fighting requires that all objects or areas of interest are sprayed, while minimizing double spraying of some objects or areas.

In order to improve the action of water when fighting a forest fire, thickened water or water containing a chemical fire retardant has been applied to timber and other foliage in the path of a fire to retard advancement of the flame front. Various methods of distributing the water, including direct spraying and aerial dropping, have been employed. Aerial dropping is advantageous because areas that are not easily accessible can be sprayed.

There are two types of fire retardants commonly employed in fighting forest, range, grass, and brushland wildfires. These fire retardants are classified as “short-term” or “long-term” retardants. Short-term retardants rely primarily upon water to retard combustion. Long-term retardants contain, in addition to water, a water-soluble chemical that effectively retards combustion for brief periods even after the water has evaporated.

The present invention is directed to compositions and methods of preventing, retarding, suppressing, and extinguishing fires by applying a sufficient amount of an aqueous composition containing an SAP, a colorant, and an opacifying agent to combustible objects, either before or after initiation of combustion.

Prior patents have disclosed the use of an SAP in the control of fires, for example, U.S. Pat. Nos. 5,190,110 and 5,849,210. U.S. Pat. No. 3,354,084 discloses a composition containing (a) an SAP, (b) a nonionic, water-insoluble solid, and (c) an optional nonionic or anionic water-soluble dye. The water-insoluble solid increases the viscosity of an SAP hydrogel for improved firefighting. It is essential that an aqueous dispersion of the insoluble solid has a resistivity of at least about 50,000 ohms, or the gel capacity of the SAP is diminished. The insoluble solids disclosed in U.S. Pat. No. 3,354,084 are essentially totally water insoluble and include titanium dioxide, silica gel, powdered aluminum, and calcium silicate, for example. The sole optional dye disclosed in U.S. Pat. No. 3,354,084 is rhodamine B.

European Patent Application 0 649 669 A1 discloses a fire extinguishing medium containing (a) an SAP, (b) a substance having a large surface structure, a capillary structure, or a fibrous structure, and (c) an optional biodegradable dye. The substances of component (b) are water-insoluble materials, like sawdust, cellulose, kieselguhr, ground plastics, ground foamed plastics, and hydrophobic silicon dioxide. This European application fails to disclose any specific dyes.

SUMMARY OF THE INVENTION

The present invention is directed to compositions and methods of preventing a combustible object from burning, and of controlling combustion of a burning combustible object, by contacting the combustible object, before or during combustion, with an aqueous fire-fighting composition comprising a water-insoluble SAP, a colorant, and an opacifying agent. The present method is especially useful in preventing, retarding, suppressing, and/or extinguishing a forest fire or wildfire.

Accordingly, one aspect of the present invention is to provide an aqueous composition that can be applied to grass, foliage, brush, trees, and similar vegetation, either before or after a fire has started. Another aspect of the present invention is to provide a fire-fighting composition that can be effectively applied using ground spray equipment, a helicopter or airplane, or other means known to fire-fighters.

Another aspect of the present invention is to provide a composition and method of controlling wildfires, wherein previously treated fire zone areas are readily distinguished from untreated fire zone areas, from both aerial and land application equipment.

Still another aspect of the present invention is to provide a fire-fighting composition comprising: (a) about 0.01% to about 20%, by weight, of an SAP; (b) about 0.005% to about 10%, by weight, of a colorant; (c) about 0.005% to about 10%, by weight, of an opacifying agent; (d) water; and (e) optional ingredients. Typically, the colorant and opacifying agent are present in the composition in a weight ratio of 1 part colorant to about 0.25 to about 5 parts opacifying agent, and preferably 1 part colorant to about 0.5 to about 3 parts opacifying agent. The colorant and SAP generally are present in a weight ratio of 1 part colorant to about 1.5 to about 10 parts SAP. The opacifying agent and SAP generally are present in a weight ratio of 1 part opacifying agent to about 1.5 to about 10 parts SAP, and preferably 1 part opacifying agent to about 2 to about 4 parts SAP.

Yet another aspect of the present invention is to provide a fire-fighting composition and method wherein combustible objects treated with the composition are readily visible to the naked eye, thereby effectively precluding a second application of the composition to previously treated combustible objects and effectively insuring that all combustible objects of interest have been treated.

Another aspect of the present invention is to provide a fire-fighting composition and method wherein visible indicia of treatment of a combustible object are substantially reduced to the naked eye about thirty days or less after treatment.

Further aspects and advantages of the present invention will become apparent from the following detailed description of the preferred embodiments, taken in conjunction with the examples and the appended claims.

DETAILED DESCRIPTION OF THE PREFERRED EMBODIMENTS

As used herein, the terms "fire-fighting" and "controlling a fire" are defined as extinguishing, suppressing, and/or retarding combustion of objects on fire, and/or preventing combustible objects from igniting. The combustible objects can be naturally occurring, e.g., brush, grass, trees, and the like, or can be man-made, e.g., buildings, platforms, and the like.

In one embodiment, the present invention is directed to a method of controlling combustion of a combustible object, particularly a forest fire or a wildfire, comprising applying a sufficient amount of a fire-fighting composition, either before or after fire initiation, to the combustible object to prevent, suppress, retard, and/or extinguish the fire, wherein the composition comprises an SAP, a colorant, an opacifying agent, and water.

In another embodiment, the present invention is directed to a fire-fighting composition useful in preventing, suppressing, extinguishing, and/or retarding the progression of a fire comprising (a) an SAP, (b) a colorant, (c) an opacifying agent, (d) water, and (e) optional ingredients known to persons skilled in the art. The present invention also is directed to a concentrated fire-extinguishing composition wherein two or more of ingredients (a), (b), (c), and (e) are premixed prior to solution or dispersion in water. Alternatively, ingredients (a), (b), (c), and (e) can be added to water individually to provide a composition of the present invention.

Various embodiments of the present invention, and a non-limiting description of the components of the present fire-fighting composition, follow.

Superabsorbent Polymer (SAP)

In general, a present fire-fighting composition contains an SAP in an amount such that sufficient free water is present to provide an excellent fire extinguishing effect with miminimum damage caused by water, and to allow its application while ensuring a very good wetting capacity, analogous to that of pure water.

More particularly, an SAP is present in the fire-fighting composition in an amount of about 0.01% to about 20%, and preferably about 0.05% to about 10%, by weight of the composition. To achieve the full advantage of the present invention, the composition contains about 0.1% to about 5% SAP, by weight of the composition. The weight percent SAP in a present composition is the amount of unhydrated SAP particles used to provide the final composition.

An SAP is a water-absorbing resin. SAPs are widely used in sanitary and hygienic goods, wiping cloths, water-retaining agents, dehydrating agents, sludge coagulants, disposable towels and bath mats, disposable door mats, thickening agents, disposable litter mats for pets, condensation-preventing agents, and release control agents for various chemicals. SAPs are available in a variety of chemical forms, including substituted and unsubstituted natural and synthetic polymers, such as hydrolysis products of starch acrylonitrile graft polymers, carboxymethylcellulose, crosslinked polyacrylates, crosslinked and partially neutralized copolymers of isobutylene and maleic anhydride, saponification products of vinyl acetate-acrylic acid copolymer, sulfonated polystyrenes, hydrolyzed polyacrylamides, polyvinyl alcohols, polyethylene oxides, polyvinylpyrrolidones, and polyacrylonitriles.

These polymers, and others, are known in the art by various names, such as superabsorbent polymers, hydrogels, hydrocolloids, and water-absorbent hydrophilic polymers, for example. As used herein, the term "SAP" refers to a superabsorbent polymer, and collectively refers to such water-absorbing materials. The term "SAP particles" refers to superabsorbent polymer particles in the dry state, more specifically, particles containing from no water up to an amount of water less than the weight of the particles, and typically less than about 5%, by weight, water. The terms "SAP gel," "SAP hydrogel," or "hydrogel" refer to a superabsorbent polymer in the hydrated state, more specifically, particles that have absorbed at least their weight in water, and typically several times their weight in water.

SAPs are lightly crosslinked hydrophilic polymers, and are discussed generally in U.S. Pat. Nos. 5,669,894 and 5,559,335, each incorporated herein by reference. SAPs can differ in their chemical identity, but all SAPs are capable of absorbing and retaining amounts of aqueous fluids equivalent to many times their own weight, even under moderate pressure. For example, SAPs can absorb one hundred times their own weight, or more, of distilled water.

An SAP typically is neutralized at least about 25 mole percent, preferably at least about 50 mole percent, and usually about 70 to 80 mole percent, to achieve optimum absorbency. Neutralization can be achieved by neutralizing the acrylic acid monomer before polymerization of the monomer, or the polymer can be neutralized after the polymerization reaction is substantially complete. After polymerization and internal crosslinking of the monomer, followed by partial neutralization, e.g., 50-100 mole percent neutralization, preferably 70 to 80 mole percent neutralization, the polymer is subdivided, e.g., shredded or chopped, for more efficient drying, then dried and milled to a desired particle size. The polymer preferably then is surface crosslinked and again dried to form the final product.

An SAP used in the composition and method of the present invention is limited only in that the SAP is capable of absorbing several times its weight of an aqueous fluid and swells to form a hydrogel. The SAP can be an acidic water-absorbing resin or a basic water-absorbing resin. Monomers useful in the preparation of an SAP are disclosed in U.S. Pat. No. 5,149,750 and WO 01/68156, each incorporated herein by reference. The SAP component of the present fire-extinguishing composition comprises an acidic or a basic water-absorbing resin neutralized about 25% to about 100%, i.e., has a degree of neutralization (DN) of about 25 to about 100.

The SAP can be anionic (an acidic water-absorbing resin) or cationic (a basic water-absorbing rein) in nature. The anionic SAPs are based on an acidic water-absorbing resin. The anionic SAPs, either strongly acidic or weakly acidic, can be any resin that acts as an SAP in its neutralized form. The acidic resins typically contain a plurality of carboxylic acid, sulfonic acid, phosphonic acid, phosphoric acid, and/or sulfuric acid moieties.

A preferred SAP is an acidic water-absorbing resin neutralized 25% to 100%. The acidic water-absorbing resin can be a single resin or a mixture of resins. The acidic resin can be a homopolymer or a copolymer. The identity of the acidic water-absorbing resin is not limited as long as the resin is capable of swelling and absorbing at least ten times its weight in water, when in a neutralized form.

The acidic water-absorbing resin typically is a lightly crosslinked acrylic resin, such as lightly crosslinked poly (acrylic acid). The lightly crosslinked acidic resin typically is prepared by polymerizing an acidic monomer containing an acyl moiety, e.g., acrylic acid, or a moiety capable of providing an acid group, i.e., acrylonitrile, in the presence of an internal crosslinking monomer, i.e., a polyfunctional organic compound. The acidic resin can contain other copolymerizable units, i.e., other monoethylenically unsaturated comonomers, well known in the art, as long as the polymer is substantially, i.e., at least 10%, and preferably at least 25%, acidic monomer units. To achieve the full advantage of the present invention, the acidic resin contains at least 50%, and more preferably, at least 75%, and up to 100%, acidic monomer units.

Ethylenically unsaturated carboxylic acid and carboxylic acid anhydride monomers useful in the acidic water-absorbing resin include acrylic acid, methacrylic acid, ethacrylic acid, α-chloroacrylic acid, α-cyanoacrylic acid, β-methylacrylic acid (crotonic acid), α-phenylacrylic acid, β-acryloxy-propionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, furmaric acid, tricarboxyethylene, and maleic anhydride. Acrylic acid is the most preferred ethylenically unsaturated carboxylic acid for preparing the SAP.

Ethylenically unsaturated sulfonic acid monomers include aliphatic and aromatic vinyl sulfonic acids, such as vinyl sulfonic acid, allyl sulfonic acid, vinyl toluene sulfonic acid, styrene sulfonic acid, acrylic and methacrylic sulfonic acids, such as sulfoethyl acrylate, sulfoethyl methacrylate, sulfopropyl acrylate, sulfopropyl methacrylate, 2-hydroxy-3-methacryloxypropyl sulfonic acid, and 2-acrylamido-2-methylpropane sulfonic acid. Phosphate-containing acidic resins are prepared by homopolymerizing or copolymerizing ethylenically unsaturated monomers containing a phosphoric acid moiety, such as methacryloxy ethyl phosphate. An extensive list of suitable SAP-forming monomers can be found in U.S. Pat. No. 4,076,663, incorporated herein by reference.

The anionic SAPs can be, for example, a poly(acrylic acid), a hydrolyzed starch-acrylonitrile graft copolymer, a starch-acrylic acid graft copolymer, a saponified vinyl acetate-acrylic ester copolymer, a hydrolyzed acrylonitrile copolymer, a hydrolyzed acrylamide copolymer, an ethylene-maleic anhydride copolymer, an isobutylene-maleic anhydride copolymer, a poly(vinylsulfonic acid), a poly(vinyl-phosphonic acid), a poly(vinylphosphoric acid), a poly(vinylsulfuric acid), a sulfonated polystyrene, and mixtures thereof. The preferred anionic SAP is a poly(acrylic acid).

The polymerization of acidic monomers, and copolymerizable monomers, if present, most commonly is performed by free radical processes in the presence of a polyfunctional internal crosslinking monomer. The acidic resins are crosslinked to a sufficient extent such that the polymer is water insoluble. Crosslinking renders the acidic resins substantially water insoluble, and, in part, serves to determine the absorption capacity of the resins. For use in absorption applications, an acidic resin is lightly crosslinked, i.e., has a crosslinking density of less than about 20%, preferably less than about 10%, and most preferably about 0.01% to about 7%. An internal crosslinking monomer most preferably is used in an amount of less than about 7 wt %, and typically about 0.1 wt % to about 5 wt %, based on the total weight of monomers.

Examples of internal crosslinking monomers include, but are not limited to, polyacrylic (or polymethacrylic) acid esters represented by the following formula (I), (I)

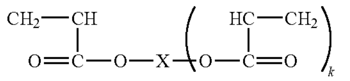

wherein x is ethylene, propylene, trimethylene, cyclohexyl, hexamethylene, 2-hydroxypropylene, $-(CH_2CH_2O)_n CH_2CH_2-$ or

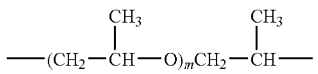

wherein n and m, independently, are an integer 5 to 40, and k is 1 or 2; and bisacrylamides, represented by the following formula (II), $$CH_2{=}CH{-}C({=}O){-}NH(CH_2CH_2NH)_1C({=}O){-}CH{=}CH_2 \quad \text{(II)}$$

wherein I is 2 or 3.

The compounds of formula (I) are prepared by reacting polyols, such as ethylene glycol, propylene glycol, trimethylolpropane, 1,6-hexanediol, glycerin, pentaerythritol, polyethylene glycol, or polypropylene glycol, with acrylic acid or meth-acrylic acid. The compounds of formula (II) are obtained by reacting polyalkylene polyamines, such as diethylenetriamine and triethylenetetramine, with acrylic acid. Specific crosslinking monomers are disclosed in U.S. Pat.

No. 6,222,091, incorporated herein by reference. Especially preferred crosslinking agents are pentaerythritol triallyl ether, pentaerythritol triacrylate, N,N'-methylenebisacrylamide, N,N'-methylenebismethacrylamide, ethylene glycol dimethacrylate, and trimethylolpropane triacrylate.

Analogous to the acidic resin, a basic water-absorbing resin, i.e., cationic SAP, useful in the present SAP-clay particles can be a strong or weak basic water-absorbing resin. The basic water-absorbing resin can be a single resin or a mixture of resins. The basic resin can be a homopolymer or a copolymer. The identity of the basic resin is not limited as long as the basic resin is capable of swelling and absorbing at least 10 times its weight in water, when in a charged form. The weak basic resin preferably is present in its cationic form, i.e., about 25% to 100% of the basic moieties, e.g., amino groups, are present in a charged form. The strong basic resins typically are present in the hydroxide (OH) or bicarbonate ($HCO_3$) form.

The basic water-absorbing resin typically is a lightly crosslinked resin, such as a poly(vinylamine) or a poly(dialkylaminoalkyl (meth)acrylamide). The basic resin also can be, for example, a lightly crosslinked polyethylenimine, a poly(allylamine), a poly(allylguanidine), a poly(dimethyldiallylammonium hydroxide), a quaternized polystyrene derivative, a guanidine-modified polystyrene, a quaternized poly((meth)acrylamide) or ester analog. See U.S. Pat. No. 6,235,965, incorporated herein by reference. The lightly crosslinked basic water-absorbing resin can contain other copolymerizable units and is crosslinked using an internal crosslinking monomer, as set forth above with respect to the acidic water-absorbing resin. Preferred basic resins include a poly(vinylamine), polyethylenimine, poly(vinylguanidine), poly(dimethylaminoethyl acrylamide) (poly(DAEA)), and poly(dimethylaminopropyl methacrylamide) (poly-(DMAPMA)).

A basic water-absorbing resin used in the present SAP particles typically contains an amino or a guanidino group. Accordingly, a water-soluble basic resin also can be crosslinked in solution by suspending or dissolving an uncrosslinked basic resin in an aqueous or alcoholic medium, then adding a di- or polyfunctional compound capable of crosslinking the basic resin by reaction with the amino groups of the basic resin. Such crosslinking agents are disclosed in U.S. Pat. No. 6,235,965, incorporated herein by reference. Crosslinking agents also are disclosed in U.S. Pat. No. 5,085, 787, incorporated herein by reference, and in EP 450 923. Preferred crosslinking agents are ethylene glycol diglycidyl ether (EGDGE), a water-soluble diglycidyl ether, and a dibromoalkane, an alcohol-soluble compound.

Copolymerizable monomers for introduction into the acidic resin or the basic resin, include, but are not limited to, ethylene, propylene, isobutylene, $C_{1-4}$alkyl acrylates and methacrylates, vinyl acetate, methyl vinyl ether, and styrenic compounds having the formula:

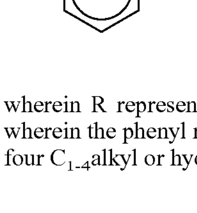

wherein R represents hydrogen or a $C_{1-6}$alkyl group, and wherein the phenyl ring optionally is substituted with one to four $C_{1-4}$alkyl or hydroxy groups.

Suitable $C_{1-4}$alkyl acrylates include, but are not limited to, methyl acrylate, ethyl acrylate, isopropyl acrylate, n-propyl acrylate, n-butyl acrylate, and the like, and mixtures thereof. Suitable $C_{1-4}$alkyl methacrylates include, but are not limited to, methyl methacrylate, ethyl methacrylate, isopropyl methacrylate, n-propyl methacrylate, n-butyl methacrylate, and the like, and mixtures thereof or with $C_{1-4}$alkyl acrylates. Suitable styrenic compounds include, but are not limited to, styrene, α-methylstyrene, p-methylstyrene, t-butyl styrene, and the like, and mixtures thereof or with $C_{1-4}$alkyl acrylates and/or methacrylates.

Any polymerization initiator known for use in preparing SAPs can be used. Examples of useful initiators are redox and thermal initiators, such as those disclosed in U.S. Pat. No. 6,359,049, incorporated herein by reference. The redox and thermal initiators can be used singly or in suitable combination. Of these, especially preferred initiators are a redox initiator comprising ammonium persulfate and sodium hydrogen sulfite, and azo initiators, such as azobisisobutyronitrile and 2,2'-azobis(2-amidinopropane)dihydrochloride, commercially available under the tradename V-50 from Wako Chemicals U.S.A., Inc., Richmond, Virginia. The initiator typically is used in an amount, calculated as solids, of about 0.1% to about 10%, based on the weight of the acrylic acid monomer, preferably about 0.5% to about 5%, based on the weight of the monomer. Depending on the amount and kind of the initiator, the initiator optionally can be used together with isopropyl alcohol, an alkyl mercaptan, or other chain transfer agent to control the molecular weight of the poly(acrylic acid).

Ultraviolet (UV) light also can be used to effect polymerization of acrylic acid. UV light can be used in conjunction with a redox initiator and/or a free radical initiator. When UV light is utilized in the polymerization step, a photoinitiator also is added to the reaction mixture in an amount well known to persons skilled in the art. Suitable photoinitiators include, but are not limited to, 2-hydroxy-1-[4-(hydroxyethyoxy)phenyl]-2-methyl-1-propanone, which is commercially available from Ciba Additives of Hawthorne, N.Y., as IRGACURE 2959, and 2-hydroxy-2-methyl-1-phenyl-1-propanone, which also is commercially available from Ciba Additives as DAROCUR 1173.

Industrial processes useful for preparing the SAP component include all processes customarily used to synthesize SAPs, as described, for example, in Chapter 3 of "Modern Superabsorbent Polymer Technology," F. L. Buchholz and A. T. Graham, Wiley-VCH (1998). A suitable process for polymerizing the acrylic acid is aqueous solution polymerization, wherein an aqueous solution containing acrylic acid and polymerization initiator is subjected to a polymerization reaction and a crosslinking reaction by the addition of an internal crosslinking monomer, such as methylenebisacrylamide. A preferred SAP in a fire-fighting composition of the present invention is neutralized poly (acrylic acid). The poly (acrylic acid) typically is neutralized to DN about 65 to about 80. Preferably, the neutralizing agent is sodium hydroxide, sodium carbonate, potassium hydroxide, or potassium carbonate. Most preferably, the neutralizing agent is potassium hydroxide or potassium carbonate, i.e., the SAP component of the fire-fighting composition is a partially neutralized, lightly crosslinked potassium polyacrylate.

Colorant

In addition to the SAP, the present method and composition utilize a colorant. The colorant is present in the composition to visibly identify combustible objects treated by the present method and composition. The visual effect of the colorant essentially precludes a double application of the composition to some combustible objects, while helping ensure that all combustible objects of interest are treated.

Therefore, incorporation of a colorant in a present fire-fighting composition is an important feature of the present invention. The colorant can be a dye or a pigment. The amount of colorant used in the method and composition of the present invention is sufficient to render various combustible objects (e.g., trees, grass, brush, or man-made objects, such as buildings or cars) treated by the fire-fighting composition visible to the naked eye.

The colorant component of the present compositions and methods allows the fire fighters to visually determine treated areas and application coverage rates of the combustible objects. For example, from the shade, tone, and intensity of the color of the treated combustible objects, fire fighters can determine whether a sufficient amount of the fire-fighting composition has been applied to the combustible objects.

A colorant incorporated in a present fire-fighting composition is limited only in that its color is in contrast to the color of the combustible objects being treated, and that the dye is soluble or dispersible in the fire-fighting composition. It is important that the colorant is distributed throughout the composition to ensure a relatively even distribution of the colorant on the treated combustible objects.

Typically, the color intensity of the colorant is essentially unchanged for several days after application until the fire-fighting composition dries on the combustible material. Drying typically occurs about five to seven days after application of the fire-fighting composition. After drying, the color intensity of the colorant begins to fade.

In a preferred embodiment, the colorant also is degradable or otherwise removable (e.g., rinsable) from treated combustible objects within about 30 days after application of the fire-fighting composition. In this embodiment, combustible objects that are unburned or merely partially burned substantially return to their natural color within about one month after application of the fire-fighting composition. Alternatively stated, the color imparted to the combustible object substantially fades, i.e., loses at least 50% of its color intensity, within 30 days after application of the composition. In embodiments, wherein the fire-fighting compound is applied to vegetation, it is preferred that the colorant is nonherbicidal and otherwise nonharmful to the environment.

The amount of colorant present in a composition of the present invention is such that a desired color and shade are imparted to treated combustible objects after application of the fire-fighting composition. Preferably, the colorant is present in a composition of the present invention in an amount of about 0.005% to about 10%, by weight of the composition. More preferably, the colorant is present in an amount of about 0.01% to about 5%, by weight of the composition. To achieve the full advantage of the present invention, the colorant is present in an amount of about 0.015% to about 2%, by weight of the composition.

Colorants that can be used in the method and composition of the present invention include, but are not limited to, a direct dye, a basic dye, an acid dye, a reactive dye, a solvent dye, a disperse dye, a leather dye, a natural dye, a sulfur dye, a vat dye, a synthetic pigment, a naturally occurring pigment, a security dye, or mixtures thereof. Preferably, the colorant is a direct dye.

Specific classes of colorants useful in the present invention include the ANTHOSIN®, BASACID®, BASANTOL®, BASAZOL®, BASOVIT®, and FASTUSOL® classes of colorants, all of which are available from BASF AG, Ludwigshafen, Germany.

Typically, colorants useful in the present invention impart a red, yellow, orange, violet, or blue color to combustible objects treated by the method and composition of present invention. Accordingly, specific colorants useful in the present invention include, but not limited to, (a) acid dyes, e.g.,
ANTHOSIN® Orange 35L
ANTHOSIN® Red 49L
ANTHOSIN® Yellow 47L
ANTHOSIN® Yellow 57L;

(b) basic dyes, e.g.,
BASAZOL® Red 71L
BASAZOL® Violet 45L
BASAZOL® Violet 47L
BASAZOL® Violet 49L
BASAZOL® Violet 57L
BASAZOL® Violet 94L
BASAZOL® Yellow 40L
BASAZOL® Yellow 46L (c) direct dyes, e.g.,

| |
|---|
| FASTUSOL ® Blue 31L |
| FASTUSOL ® Blue 47L |
| FASTUSOL ® Blue 79L |
| FASTUSOL ® Orange 49L |
| FASTUSOL ® Orange 80LN |
| FASTUSOL ® Orange PR268L |
| FASTUSOL ® Red 43LN |
| FASTUSOL ® Red 45L |
| FASTUSOL ® Red 50L |
| FASTUSOL ® Red 50L 150% |
| FASTUSOL ® Red 51L |
| FASTUSOL ® Red 53L |
| FASTUSOL ® Violet 08L |
| FASTUSOL ® Yellow 14L |
| FASTUSOL ® Yellow 30L |
| FASTUSOL ® Yellow 49L |
| FASTUSOL ® Yellow 66L |
| FASTUSOL ® Yellow 70L |
| FASTUSOL ® Yellow 76LN |
| FASTUSOL ® C Blue 49LS |
| FASTUSOL ® C Blue 76L NB 70% |
| FASTUSOL ® C Blue 77LS |
| FASTUSOL ® C Blue PR929L 200% |
| FASTUSOL ® C Red 32L |
| FASTUSOL ® C Red 61L |
| FASTUSOL ® C Violet 04 25% |
| FASTUSOL ® C Violet 92 |
| FASTUSOL ® Yellow 36LV |
| FASTUSOL ® C Yellow 97L |

(d) additional colorants, e.g.,
BASANTOL® Orange 273
BASANTOL® Red 311
BASANTOL® Yellow 099
BASANTOL® Yellow 215
BASONYL® Yellow 105
BASONYL® Orange 204
BASONYL® Red 482
BASONYL® Red 482 Low-Dust
BASONYL® Red 483
BASONYL® Red 485
BASONYL® Red 540
BASONYL® Red 545 Liquid
BASONYL® Red 555 Liquid
BASONYL® Red 560
BASONYL® Violet 600
BASONYL® Violet 602 Liquid BASONYL® Violet 609 Liquid
BASONYL® Violet 610
BASONYL® Blue 636
BASONYL® Blue 640
BASONYL® Blue 644 Liquid
BASACID® Yellow 094
BASACID® Yellow NB 132 Liquid
BASACID® Yellow NB 216 Liquid
BASACID® Yellow 226
BASACID® Orange NB 282 Liquid
BASACID® Red 316
BASACID® Red NB 384 Liquid
BASACID® Red NB 391 Liquid
BASACID® Red NB 432 Liquid 150%
BASACID® Red 495 Liquid
BASACID® Red NB 510 Liquid
BASACID® Blue 762 Liquid For use in forest fires and wildfires, the preferred colorants impart a yellow, red, or orange color to treated foliage. Various useful colorants include, but are not limited to, Direct Red 81, Direct Red 239, Direct Red 254, Direct Yellow 11, Direct Yellow 6, Direct Yellow 127, Direct Orange 102, Direct Orange 102:1, Direct Orange 116, and Direct Yellow 5, available from BASF Corporation, Mount Olive, N.J.

Opacifying Agents

In addition to the SAP and colorant, a present fire-fighting composition contains an opacifying agent. The opacifying agent is included to improve the visual effect of the colorant. For some colorants, and in some applications, combustible objects treated with a composition lacking an opacifying agent are somewhat difficult to observe, especially from the air. The presence of an opacifying agent improves the visibility of the applied fire-fighting composition. The amount of opacifying agent included in a present fire-fighting composition is sufficient to provide an opaque composition, which improves the visibility of the fire-fighting composition after application to combustible objects.

The opacifying agent can be organic or inorganic in chemical composition. In particular, the opacifying agent comprises an inorganic compound an organic polymeric material, or a mixture thereof. The opacifying agent typically is white or off-white in color. The opacifying agent renders an SAP hydrogel opaque, and thereby increases the visibility of an SAP hydrogel after application to combustible objects.

An inorganic opacifying agent used in the present composition is a sparingly water-soluble compound. As used herein, the term “sparingly water soluble” is defined as an inorganic material having a water solubility, in its anhydrous form, of about 0.0005 to about 0.005 grams per 100 ml of water at 25° C. An organic polymeric opacifying agent is a synthetic homopolymer or copolymer, preferably dispersed in water to form an emulsion or a latex.

The opacifying agent, therefore, can be, but is not limited to, calcium carbonate ($CaCO_3$), a styrene-butadiene copolymer, a styrene-vinylpyrrolidone copolymer, a styrene-butadiene-acrylonitrile copolymer, an acrylic polymer, a polyvinyl acetate, a polyvinyl acrylate, a starch, a polystyrene, a polyethylenimine, a polyethylene, a polyvinyl alcohol, or a mixture thereof. Preferably, the opacifying agent is a synthetic organic homopolymer or copolymer, more preferably dispersed in water as an emulsion or a latex for ease of incorporation into a present fire-fighting composition.

The amount of opacifying agent present in a fire-fighting composition is 0.005% to about 10%, by weight, of the composition. Preferably, the opacifying agent is present in the composition at about 0.01% to about 5%, by weight of the composition. To achieve the full advantage of the present invention, the opacifying agent is present in an amount of about 0.015% to about 2%, by weight of the composition. Typically, the amount of opacifying agent is present in the composition in a sufficient amount such that a desired opacity level and color intensity are provided after application of the composition to combustible objects.

Water

The carrier of the present fire-fighting composition is water. However, small amounts of an organic solvent, i.e., up to about 10%, for example, about 0.01% to about 10%, by weight of the composition, optionally can be included in the composition to facilitate manufacture of the composition, or provide other beneficial properties, such as ease of application of the composition. The organic solvent is water soluble, and can be for example, an alcohol, a diol, a polyol, a glycol ether, or a mixture thereof.

Optional Ingredients

A fire-fighting composition of the present invention also can include optional ingredients known to persons skilled in the art. Each optional ingredient, if present at all, is included in the composition in a sufficient amount to perform its intended function without adversely effecting the composition or its use as a fire prevention, suppressing, retarding, or extinguishing agent. Typically, each optional ingredient is present in an amount of up to about 10%, by weight, of the composition, and, in total, the optional ingredients are present up to about 30%, by weight, of the composition. For example, the composition can include one or more of a viscosity modifier, a dispersant, a pH modifier, and a surfactant.

Viscosity modifiers optionally are included in the composition of the present invention to stabilize the composition, as well as improve the application properties of the composition. Viscosity modifiers include, but are not limited to, associative thickeners, alkali swellable thickeners, alkali soluble thickeners, polymeric thickeners, and mixtures thereof. Specific examples of viscosity modifiers include, but are not limited to, polyvinyl alcohol, a water-soluble or water-dispersible cellulose derivative, such as hydroxyethyl cellulose, hydroxypropyl cellulose and sodium carboxymethylcellulose, a polyether, a urethane-modified polyether, a polycarboxylic acid, a polyvinylpyrrolidone, a polyoxyethylene derivative, such as a polyethylene glycol ether or a polyethylene glycol distearate, sodium alginate, and mixtures thereof.

If needed or desired, a dispersant can be added to stabilize the composition and improve application properties. Useful dispersants include, but are not limited to, inorganic dispersing agents, such as a sodium salt of a polycarboxylic acid, a sodium or ammonium salt of a fused naphthalene sulfonate, a polyoxyalkylene alkyl ether of phenol ether, a sorbitan fatty acid ester, a polyoxyalkylene fatty acid ester, a glycerin fatty acid ester, a polyoxyethylene styrene phenol, sodium tripolyphosphate, sodium hexametaphosphate, an organosilanol derivative of tung oil or linseed oil, high erucic acid rapeseed oil, and mixtures thereof.

The composition, optionally, can further include a pH adjusting agent to provide a desired pH value. Corrosion of fire-fighting apparatus and objects sprayed for fire protection can be minimized or avoided by adjusting the pH of the fire-fighting composition to about 6 to about 8. The pH adjusting agent can be any pH adjusting agent that provides the desired pH. The pH adjusting agent typically is a base. Examples of pH adjusting agents include, but are not limited to, sodium hydroxide, potassium hydroxide, sodium carbonate, potassium carbonate, sodium hydrogen carbonate, ammonium hydroxide, ammonia, an amine, triethanolamine, 3-dimethylaminoethanol, and mixtures thereof.

A surfactant also can be included in the composition to improve the application properties of the composition. The surfactant can be an anionic, a nonionic, or an ampholytic surfactant.

To manufacture a fire-fighting composition, an SAP, a colorant, an opacifying agent, and any other optional ingredients are admixed with water and an optional organic solvent. The ingredients can be individually added to the water. One or more ingredient also can be predissolved or predispersed in an organic solvent prior to addition to water. In addition, the colorant can be admixed with the opacifying agent and/or SAP to form a premix that then can be added to the water. Alternatively, the colorant and opacifying agent can be admixed, then added to the water or a preformed SAP hydrogel.

Also envisioned is a concentrated premix that can be added to water to provide a fire-fighting composition of the present invention. The concentrated premix comprises at least two of the SAP, colorant, and opacifying agent, in predetermined desired amounts, for addition to a proper amount of water to provide a present fire-fighting composition. The concentrated premix also can include one or more of the optional ingredients. The water can include an organic solvent as disclosed above.

A present fire-fighting composition is effective because it immobilizes water where the water is needed, i.e., on a combustible object, and excludes oxygen from the surface of the combustible object. The composition functions by forming a relatively gas-impermeable barrier on the surface of combustible objects, which prevents, or substantially reduces, oxygen from reaching the surface to support combustion of the combustible objects. This effect often prevents combustion from initiating or continuing, and substantially increases the time required for combustion. In addition, a present aqueous composition forms a thermal barrier that slows the transfer of heat from a fire to a combustible object. Importantly, the dye and opacifying agent provide an excellent visual indicator to mark where the fire-fighting composition has been applied, thereby providing a more effective appliction of the composition. By evenly applying a sufficient amount of the composition to combustible objects, fire control and prevention are enhanced because fire fighters can visualize when all desired combustible objects are treated.

An aqueous fire-fighting composition of the present invention is used by applying the composition to objects that are already burning, or by applying the composition to objects that are not burning, but are in danger of igniting, such as foliage, trees, a building, or other structures near a burning building. In this way, the aqueous fire-fighting composition can be used both to extinguish and suppress fires and to retard and prevent fires from spreading.

A present fire-fighting composition can be applied by spraying from the land or by aerial application, for example. The colorant and opacifier provide an indicator for the firefighters to visually identify which combustible objects have been treated. The opacifying agent enhances the visibility of the composition on the combustible objects. The SAP facilitates the action of the water in extinguishing the fire, and helps prevent combustion of unignited combustible objects. In preferred embodiments, treated combustible objects substantially regain their natural color within about 30 days. In particular, the composition typically is rinsed from, or the colorant is degraded, within about 30 days, such that unburned objects substantially return to their natural color.

As noted above, the aqueous fire-fighting composition can be used to prevent fires from spreading, as well to extinguish fires. The composition also can be used to form a firebreak or firewall that prevents a fire from spreading. In attempting to contain large fires, such as forest fires, firefighters often attempt to prevent the fire from spreading by removing combustible materials. In fighting forest fires, for example, firefighters may clear a band of trees along a continuous path spaced from the fire to form a firebreak, which prevents the fire from spreading to other trees and combustible objects on a nonburning side of the cleared path. The composition and method of the present invention can be used to prevent a forest fire from spreading without clearing unburned trees from the area.

A present composition therefore can be applied to a band of trees rather than removing the trees to form a fire barrier. The contrasting color provided by the present composition allows firefighters to more accurately apply the composition where needed, especially for compositions applied from the air. The treated foliage substantially returns to its natural color within about 30 days after treatment.

The invention is further described in the following examples, which are merely illustrative and do not in any way limit the scope of the invention as described and claimed.

EXAMPLE 1 (COMPARATIVE)

A fire-fighting composition was prepared by admixing 1000 g water, 5 g SAP (potassium polyacrylate) from BASF, and 2 g of FASTUSOL® Red 51L colorant from BASF. After admixing, the pH of the composition was adjusted to 7 with sodium hydroxide. The resulting hydrogel composition was spread on cardboard targets approximately 12"×12" square, then the targets were observed by the naked eye from various distances, and under indoor and natural outdoor light conditions. The amount of colorant was adjusted to various levels, and the resulting compositions were applied to additional cardboard targets to optimize the color visibility of the clear hydrogel. In this controlled experiment, color visibility was sufficient at relatively close distances. However, it was determined that at greater distances (e.g., from aerial application), or when the composition is applied to nonplanar surfaces, this fire-fighting composition would be hard to detect, thus making it difficult to ensure an even and complete application of the composition to combustible objects.

EXAMPLE 2

A fire-fighting hydrogel composition was prepared by admixing 1000 g of water, 5 g of SAP from BASF, 2 g of FASTUSOL® Red 51L colorant from BASF, and 3 g of calcium carbonate ($CaCO_3$) as an opacifying agent. After admixing, the pH of the hydrogel was adjusted to 7 with sodium hydroxide. The resulting hydrogel composition was spread on cardboard targets approximately 12"×12" square, then the targets were observed by the naked eye from various distances and under indoor and natural outdoor light conditions Other colorants also were evaluated for visibility. The amounts of colorant and $CaCO_3$ were adjusted to various levels, and the resulting compositions were applied to additional cardboard and colored paper targets in order to optimize the color visibility and opacity of the opaque hydrogel. The visibility of the composition of Example 2 was improved over the visibility of the composition of Example 1, especially at greater distances from the targets.

EXAMPLE 3

A fire-fighting composition is prepared as described in Example 2, and the composition is spread on various target materials, including dark green colored paper, vinyl siding, cedar shakes, and stucco. The treated target materials then are observed from various distances and under indoor and natural outdoor light conditions. The target materials then are exposed to natural weathering and direct sunlight conditions for a period of 7 days. The hydrogel composition applied to the target materials is observed for amount of drying and degree of color fade. All exposed areas fade significantly during this period to a light orange to clear residue. The above targets then are partially cleaned using fresh tap water and mild abrasion (i.e., sponge or soft scrub material). All residue of the hydrogel composition is easily removed from the target materials.

EXAMPLE 4

A fire-fighting composition is prepared by adding 1.8 ml of a colorant and 1.8 ml of a high molecular weight polyethylenimine (BASONAL® White FO 1, available from BASF Corporation) to 990 ml of water, then stirring until homogeneous. To the resulting mixture was added about 5.75 gm of a sodium polyacrylate SAP, followed by stirring to provide a homogeneous composition. The three colorants added to separate compositions were FASTUSOL® Red 51L, FASTUSOL® Orange 80LN, and FASTUSOL® Yellow 76LN. A comparative example free of a high molecular weight polyethylenimine and colorant also was prepared.

A sample of each opacified composition was applied to a 2'×4' sheet of Astroturf. A sample of uncolored and unopacified SAP hydrogel also was applied to a sheet Astroturf. The uncolored and unopacified SAP hydrogel was not visible on the Astroturf. The color of the Astroturf treated with a composition of the present invention was clearly visible. In an additional sample wherein the weight ratio of opacifier to colorant was increased to 2:1, the color visibility of the applied fire-fighting composition was further enhanced.

After application to the Astroturf, a present fire-fighting composition dried after about 5 days, at which time the colorant applied to the Astroturf began to fade and the white opacifying agent became clear to light amber in color.

It will be understood that the specification and examples are illustrative only, are not limitative of the present invention, and other embodiments within the spirit and scope of the invention will suggest themselves to those skilled in the art.

What is claimed is:

1. A method of controlling a fire consuming a combustible object comprising a step of applying a sufficient amount of a fire-fighting composition to the combustible object to retard, suppress, or extinguish the fire, said fire-fighting composition comprising:

(a) 0.01% to 20%, by weight, of a superabsorbent polymer;

(b) 0.005% to 10%, by weight, of a colorant;

(c) 0.005% to 10%, by weight, of an additional opacifying agent selected from the group consisting of calcium carbonate, a styrene-butadiene copolymer, a styrene-vinylpyrrolidone copolymer, a styrene-butadiene-acrylonitrile copolymer, an acrylic polymer, a polyvinyl acetate, a polyvinyl acrylate, a starch, a polyethylenimine, a polystyrene, a polyethylene, a polyvinyl alcohol, and mixtures thereof; and (d) water.

2. The method of claim 1 wherein the opacifying agent comprises calcium carbonate.

3. The method of claim 1 wherein the opacifying agent comprises an emulsion or a latex of the styrene-butadiene copolymer, styrene-vinylpyrrolidone copolymer, styrene-butadiene-acrylonitrile copolymer, acrylic polymer, polyvinyl acetate, polyvinyl acrylate, starch, polyethylenimine, polystyrene, polyethylene, polyvinyl alcohol, or mixtures thereof.

4. The method of claim 3 wherein the opacifying agent comprises a polyethylenimine.

5. The method of claim 1 wherein the composition further comprises up to 10%, by weight, of a water soluble organic solvent.

6. The method of claim 1 wherein the composition further comprises one or more optional ingredient selected from the group consisting of a viscosity modifier, a dispersant, a pH modifier, a surfactant, and mixtures thereof.

7. The method of claim 1 wherein the composition imparts a color to the combustible object.

8. The method of claim 7 wherein the color imparted to the combustible object substantially fades within 30 days after application of the composition.

9. The method of claim 7 wherein the color imparted to the combustible object is of sufficient intensity such that a combustible object having the composition applied thereto is differentiated from the combustible object that lacks an application of the composition by a naked eye.

10. The method of claim 1 wherein the composition is applied by ground equipment or by aerial equipment.

11. A composition comprising (a) 0.1% to 5%, by weight, of a superabsorbent polymer;

(b) 0.015% to 2%, by weight, of a colorant;

(c) 0.015% to 2%, by weight, of an additional opacifying agent selected from the group consisting of calcium carbonate, a styrene-butadiene copolymer, a styrene-vinylpyrrolidone copolymer, a styrene-butadiene-acrylonitrile copolymer, an acrylic polymer, a polyvinyl acetate, a polyvinyl acrylate, a starch, a polyethylenimine, a polystyrene, a polyethylene, a polyvinyl alcohol, and mixtures thereof; and (d) water.

12. The composition of claim 11 further comprising up to about 10%, by weight, of a water-soluble organic solvent.

13. The composition of claim 11 further comprising one or more optional ingredient selected from the group consisting of a viscosity modifier, a dispersant, a pH modifier, a surfactant, and mixtures thereof.

14. The composition of claim 11 wherein the colorant and the opacifying agent are present in a weight ratio of 1 part colorant of 0.5 to 3 parts opacifying agent.

15. The composition of claim 11 wherein the opacifying agent and the superabsorbent polymer are present in a weight ratio of 1 part opacifying agent to 2 to 4 parts superabsorbent polymer.

* * * * *